United States Patent [19]
Choa

[11] Patent Number: 5,847,855
[45] Date of Patent: Dec. 8, 1998

[54] INTEGRATED COHERENT TRANSCEIVER

[75] Inventor: Fow-Sen Choa, Ellicott City, Md.

[73] Assignee: University of Maryland Baltimore County, Baltimore, Md.

[21] Appl. No.: 685,681

[22] Filed: Jul. 24, 1996

[51] Int. Cl.[6] .................................................. H01B 10/00
[52] U.S. Cl. ........................... 359/152; 359/113; 372/50; 385/14
[58] Field of Search .................................... 359/113, 152, 359/162, 163, 180, 181, 188, 189, 195; 372/29, 45, 50; 385/14

[56] References Cited

U.S. PATENT DOCUMENTS 5,117,469  5/1992  Cheung et al. ............................ 372/45
5,144,637  9/1992  Koch et al. ................................ 372/50

OTHER PUBLICATIONS

T.L. Koch et al., "Balanced operation of a GaInAs/GaInAsP multiple-quantum-well integrated heterodyne receiver", IEEE Photon. Technol. Lett., vol. 2, pp. 577–580, 1990.
F.S. Choa et al., IEEE Photon. Technol. Lett., vol. 1, p. 376, 1989.
F.S. Choa et al., "Very High Sidemode–Suppression–Ratio Distributed–Bragg–Reflector Lasers Grown by Chemical Beam Epitaxy", Electronics Letters May 21, 1992, vol. 28 No. 11, p. 1001.
R.A. Linke et al., "Full–Duplex Optical Transmission Using Self–Heterodyne Laser Transceivers", IEEE Photonics Technology Letters, vol. 1, No. 9 Sep. 1989, pp. 278–280.
F.S. Choa et al., "InGaAs/InGaAsP Integrated Tunable Detector Grown by Chemical Beam Epitaxy", Applied Physics Letters Sep. 27, 1993, vol. 63, No. 13, pp. 1836–1838.

*Primary Examiner*—Rafael Bacares
*Attorney, Agent, or Firm*—Gary M. Nath; Harold L. Novick; Nath & Associates

[57] ABSTRACT

An integrated coherent transceiver capable of being operated with only one below threshold FP mode is described which can be used for both receiving downstream signals and transmitting upstream signals with either FSK or ASK format. The device allows the full tuning range of distributed-Bragg-reflector ("DBR") lasers to be utilized to achieve approximately one thousand channels in a local access system with 1 GHz channel spacing. The sensitivity can be further enhanced by obtaining balanced operation (without changing the simple device structure) to cancel the laser intensity noise.

13 Claims, 5 Drawing Sheets

INTEGRATED COHERENT TRANSCEIVER

BACKGROUND OF THE INVENTION

Wavelength-division-multiplexed (WDM) transmission is indispensable to fully exploit the potential for very wide bandwidth in optical fiber communication systems. For example, local access networks require large amounts of channels for massive amounts of users. Coherent WDM communication systems are currently one of the very few technologies that can achieve large scale density in a multichannel system.

As reported by R. A. Linke, et al., in "Full-Duplex Optical Transmission Using Self-Heterodyne Laser Transceivers", IEEE Photon. Technol. Lett., vol. 1, pp. 278–280, 1989, using the gain section of the local oscillator as a receiver achieved full duplex operation but was not very sensitive. In their case, there are many possible Fabry-Perot ("FP") modes in the cavity and it is much easier to generate mode beating, mode partition, side modes signal interaction, and side mode injection noise. Therefore, the full tuning range of the laser (e.g., 1 THz for a distributed-Bragg-reflector laser) cannot be utilized. Such a device cannot practically be utilized in large scale broad-band communication system operation. The multi-wavelength signals will interact with all the modes and generate all kinds of noise. Even for small scale multiwavelength systems, the equivalent tuning range of the device will be limited to only one FP mode spacing.

One possible competing technology called passive-optical-network ("PON") requires grating based wavelength demultiplexers which have not achieved the same quality of wavelength resolution as that achieved by coherent communication systems. In a system using PON, increasing the number of users N, requires an increase in the demultiplexer complexity on the order of $N^2$. The yield and cost problems associated with manufacturing such large demultiplexers may well prevent PON from competing with the coherent communication technology in the area of broadband access networks.

SUMMARY OF THE INVENTION

An integrated coherent transceiver constructed according to the principles of the present invention has the following special characteristics. It has a very simple device structure and therefore can be produced very cost effectively. It has excellent sensitivity performance (−43.4 dBm at 105 Mb/s). It can be used for both receiving downstream and transmitting upstream signals with either frequency-shift-keying ("FSK") or amplitude-shift-keying ("ASK") formats. These characteristics allow it to function as a high performance terminal device for densely spaced wavelength-division-multiplexing ("WDM") broadband access systems. Devices constructed according to the principles of the present invention allow the full tuning range of distributed-Bragg-reflector ("DBR") lasers to be utilized to achieve approximately one thousand channels in a local access system with 1 GHz channel spacing. The sensitivity can be further enhanced by obtaining balanced operation (without changing the simple device structure) to cancel the laser intensity noise.

DETAILED DESCRIPTION OF THE PREFERRED EMBODIMENTS

Figure 1:
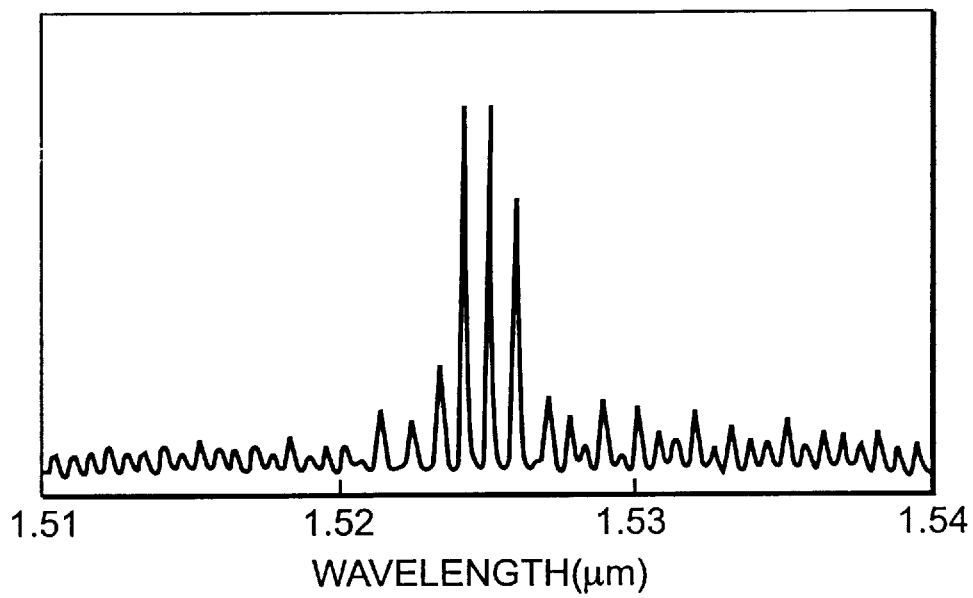
FIG. 1 depicts the below threshold noise spectrum of a typical DBR laser.

Even though the distributed-Bragg-reflector ("DBR") laser is single mode when biased above threshold, it usually allows more than one Fabry-Perot ("FP") mode inside the Bragg reflection band (stop band) of the waveguide grating. FIG. 1 shows the below threshold noise spectrum of a typical DBR laser we have been using. When such a device is used for active filtering and amplifying, signals with the same frequencies as other FP modes will also be amplified and make the output very noisy. Even though a DBR laser tuning range of more than 1000 GHz has been reported, this problem limits the useful tuning range of the tunable detector to less than one of the FP mode spacing. In order to fully utilize the tuning range of a DBR active filter, a carefully designed device with only one below threshold FP mode has to be utilized.

Figure 2:
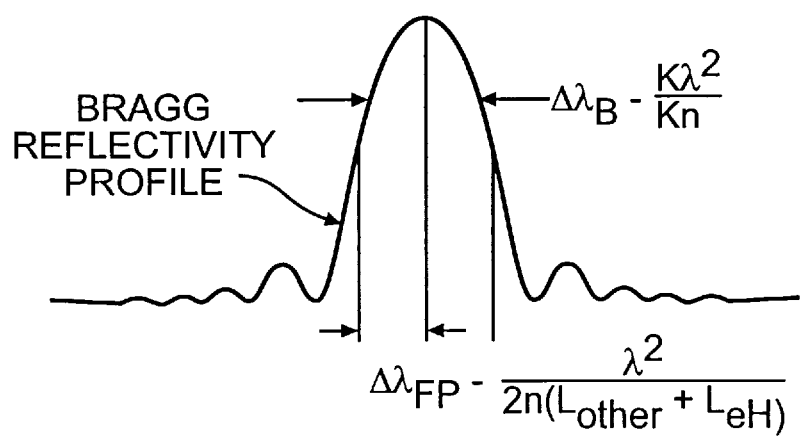
FIG. 2 depicts the mode behavior of a DBR laser.

The longitudinal mode behavior of a DBR laser can be explained as shown in FIG. 2. The lowest threshold (lasing) mode is selected by the Bragg reflection band of the waveguide grating from the equally spaced FP modes which are determined by the total effective cavity length of the DBR laser. In order to achieve the desired characteristics of only one below threshold FP mode in the cavity, we can either reduce the width of the stop band or increase the mode spacing of the FP modes to reject all the other modes and allow only one possible lasing mode under the Bragg reflection band. The Bragg reflection bandwidth is controlled by the grating coupling constant, k, which can be calculated according to the formula $$K = \frac{k_0 \int_d \Delta(n^2(x,z))|\epsilon|^2 dx}{2\beta \int_{-\infty}^{+\infty} |\epsilon|^2 dx},$$

where $k_o$ is the wave vector in vacuum, $\beta$ is the propagation constant, n is the reflection index, and $\epsilon$ is the electrical field. The amplitude of K is almost linearly proportional to the grating depth, d, when it is small. The larger the overlapping integral of the grating index difference with the mode profile, the larger is the K.

Figure 3A:
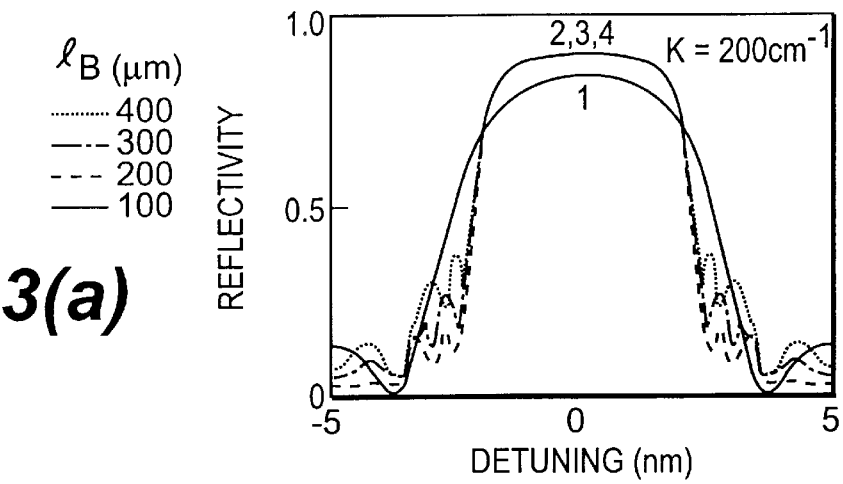
FIG. 3 depicts the relationship between K and the reflection spectra at different grating lengths.
Figure 3B:
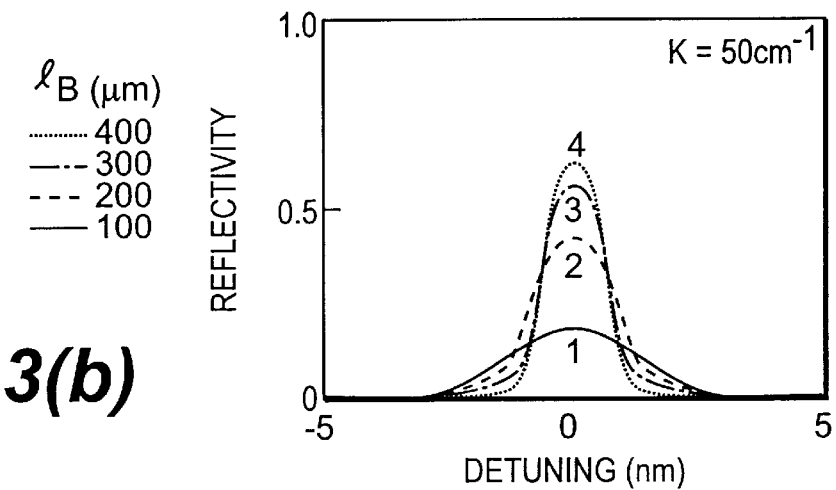
Figure 3C:
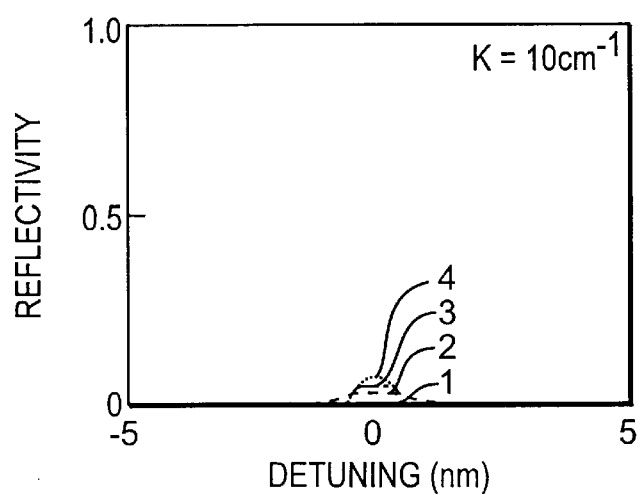

FIG. 3 depicts the relationship between K and the reflection spectra at different grating lengths. For a strong grating, such as K equal 200 cm$^{-1}$, the reflection spectra has a broad width and the peak reflectivity saturates very quickly with increasing grating length up to only 200 µm. The peak reflectivities are less than 100% because in all the calculations a waveguide loss of 10 cm$^{-1}$ was assumed. For a weak grating such as K=10 cm$^{-1}$, even though the band is narrow, to provide a reflectivity of more than 50% requires a grating length of more than several millimeters. Controlled by the thickness of the grating layer, the width of the stop band, theoretically, can be reduced to infinitely small. However, due to the increasing absorption loss and the scattering loss from either the roughness of the waveguide sidewall or the nonuniformity of the grating layer with increased grating waveguide length, it is impractical to use a very weak grating. Using a very weak grating waveguide will also increase the effective cavity length which may not benefit the design due to the reduction of FP mode spacing. The FP mode spacing is determined by the total cavity length and can be independently increased by reducing the length of the gain section. However, there is also a length limit in that the gain section has to be long enough to provide the minimum threshold gain.

(1) From previous experience, we know that for a quantum well laser a minimum length of 200–250 $\mu$m long is needed to achieve the lasing threshold.

(2) In order to obtain a good detection efficiency a grating transmission of more than 40% is desired.

Figure 5A:
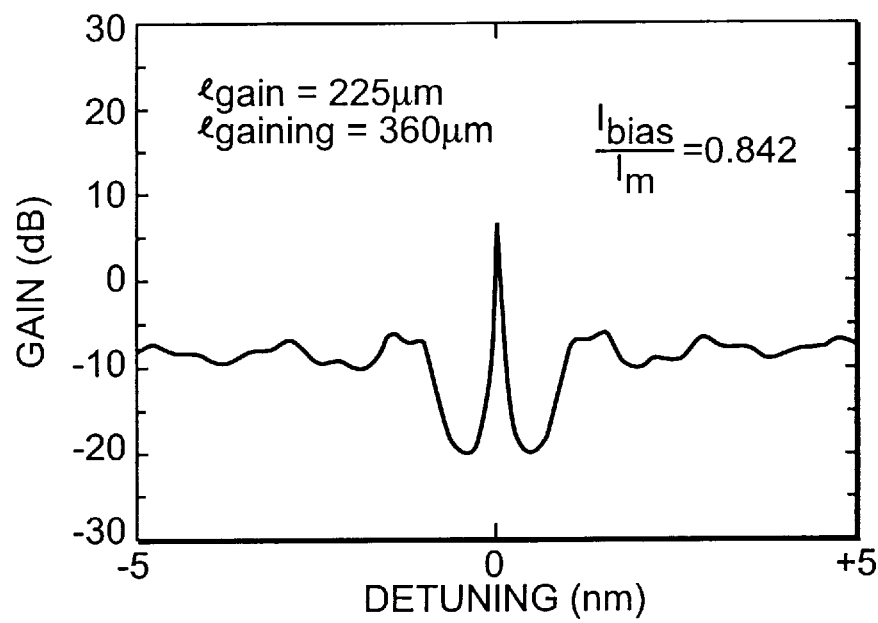
FIGS. 5(a) and (b) depict the calculated and measured noise spectra, respectively, of a DBR laser with a gain section of 225 µm long and a grating section of 360 µm long.
Figure 5B:
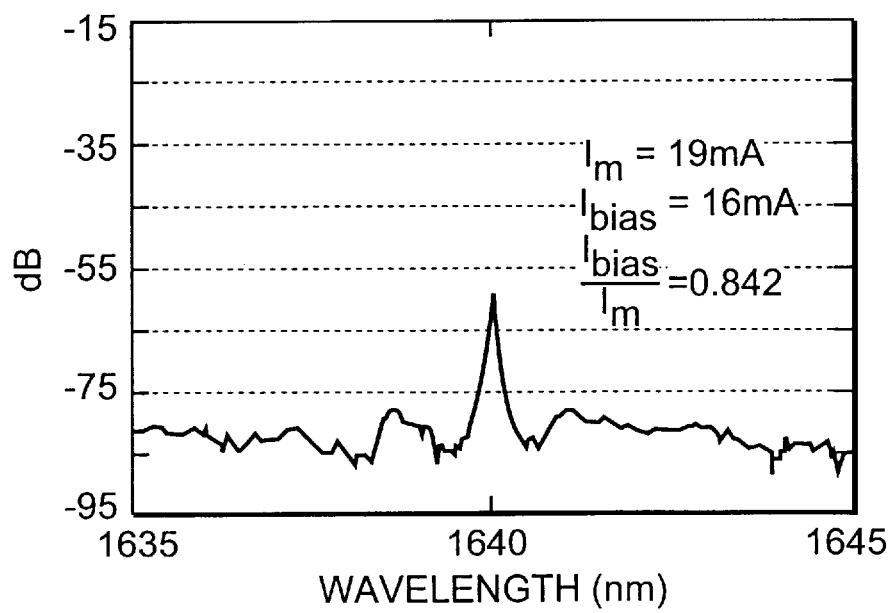

(3) Under conditions (1) and (2), we calculated the mode characteristics with different K's and cavity lengths (L's) (by putting the Bragg reflectivity into the transmission formula of a FP cavity) to achieve single mode with shortest cavity length. A nearly optimized result is shown in FIG. 5($a$) with a K of 50 cm$^{-1}$ and with a gain section of 225 $\mu$m long and a grating section of 360 $\mu$m long. We have followed this design to fabricate the device by taking advantages of the excellent uniformity and well controlled growth rate and nearly obtained exactly the desired features.

Figure 4:
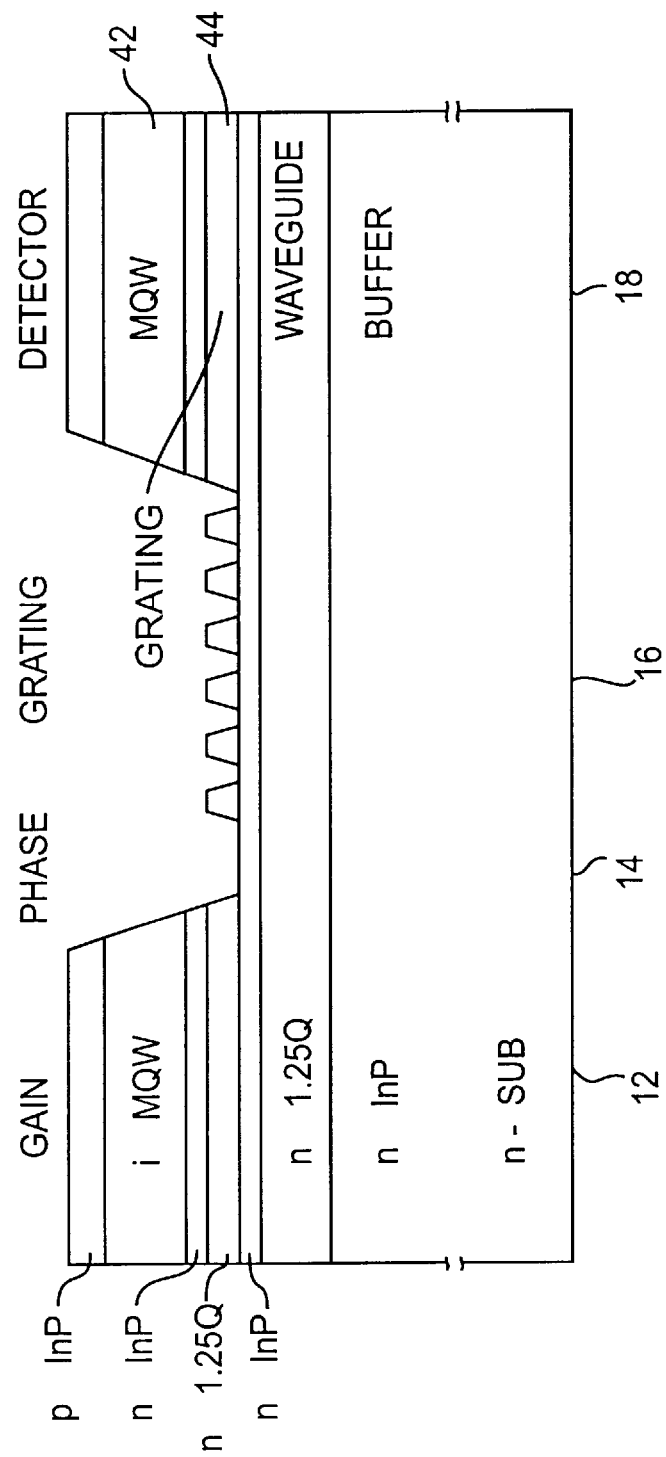
FIG. 4 shows the growth layer and device structure of the integrated device according to the teachings of the present invention.

FIG. 4 shows the growth layer and device structure of the integrated device. A waveguide detector, indicated generally as 18, with the same material as the laser active medium is added to the back of the DBR laser with no additional processing steps added. The performance of this type of waveguide detector has previously been studied as described in IEEE Photon. Tech. Lett. 1,376 (1989). The grown layers of the DBR laser have a 2700 -Å-thick 1.25 Q grating layer with thin InP etch stop layers in between. The gain medium 42, on top of the grating layer 44, is composed of six 50-Å-thick InGaAs strained quantum wells and five 120 Å 1.25 Q barriers. Because the thickness of the grating layer is controlled by the growth time, the waveguide grating coupling constant, K, is also well defined. The device is processed by following standard active-passing etching, grating etching, stripe etching, MOVED regrowth, and multi-section metallization. The completed devices were mounted for characterization and gain measurement. The fabricated devices have laser thresholds around 20 mA when biased above threshold. Some of the lasers have generated record high side-mode suppression ratio of 58.5 dB.

The below threshold mode behavior is shown in FIGS. 5($a$) and ($b$). Both the theoretical and measured spectra show the two side modes are suppressed and cannot grow when bias is increased.

Figure 6:
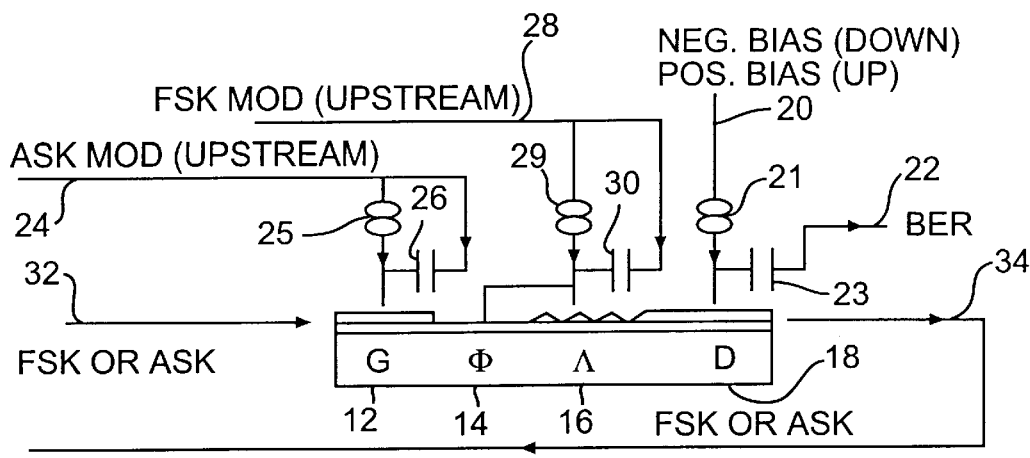
FIG. 6 is a schematic diagram of a device constructed according to the principles of the present invention for receiving and transmission operation.

We turn now to a description of the integrated coherent transceiver constructed according to the principles of the present invention depicted in FIG. 6. The integrated coherent transceiver has a very simple structure (making it manufacturable at low cost) and record breaking receiving sensitivity. It can also be used for both receiving downstream signals and transmitting upstream signals with either FSK or ASK format. In local access, downstream signals occupy most of the bandwidth. In that situation a terminal device will mostly perform as a receiver. Upstream signals, such as making phone calls or ordering movies, require much less bandwidth or much fewer time slots. In either a WDM broadcast system, where only a few channels will be assigned for upstream communication, or in a system where the user transmission or receiving wavelengths are fixed as to their identities, this simple device performs very well.

The device structure and receiving and transmission operation are described with reference to FIG. 6 (see, also, FIG. 4). The gain section 12 (G), phase section 14 ($\phi$), and grating section 16 ($\Lambda$) form the local oscillator cavity and signal mixer. When the detector section 18 is negatively biased according to the bias applied via line 20 through an inductor 21, the device is operated under listen (downstream) mode and beating signals can be obtained from the detector (at 22) via capacitor 23 for followed electrical ASK or FSK demodulation. When the device is operated under talk (upstream) mode, the detector is forward biased and works like an amplifier. A driving light signal or pumping signal 32 enters the device through the gain section 12. The output signal is identified generally as 34. FSK or ASK signals can be sent out by modulating the phase or gain sections of the local oscillator. FSK signals are amplitude modulated via control line 24 via inductor 25 and capacitor 26. ASK signals are modulated via control line 28 via inductor 29 and capacitor 30. (However, amplitude modulating in this manner may introduce chirping. Amplitude modulating is preferably carried out using an external modulator in the manner described below with reference to FIG. 7($b$).)

The beating signal can be obtained from not only the detector section, but also the gain section of the local oscillator through coupling capacitors 26 and 30. Interestingly, the extracted electrical signals from the two terminals have a 180 degree difference in phase. It is therefore possible to cancel the intensity noise of the local oscillator by combining the two signals with different amplification factors. That can be done by appropriately arranging gain and phase in each arm and sending them into a power combiner. The sensitivity is thus further improved.

Figure 7A:
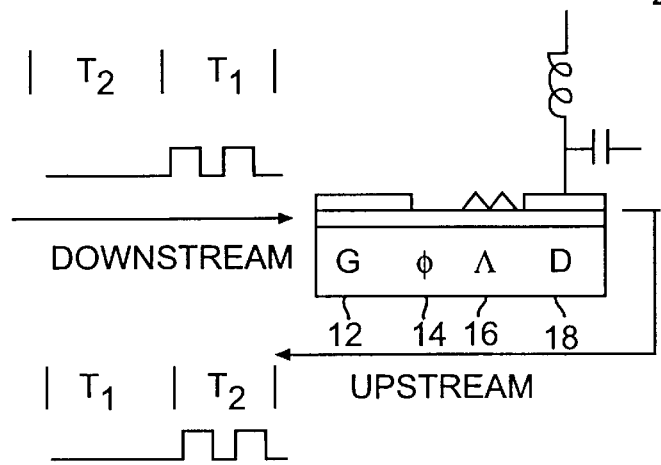
FIGS. 7(a) and (b) are simplified schematic diagrams of a transceiver constructed according to the principles of the present invention using a half-duplex operating scheme and a full duplex operating scheme respectively.
Figure 7B:
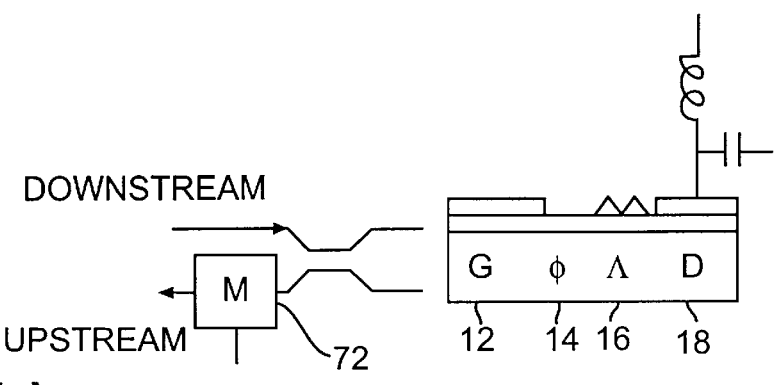

FIG. 7($a$) and ($b$) depict a transceiver constructed according to the principles of the present invention. The incoming signals are mixed with the local oscillator ("LO") light in the local oscillator itself. As was described above with reference to FIG. 6, the beating signals are taken out from the detector section through a bias "T". In the configuration depicted in FIG. 7($a$), the detector section is negatively biased during the time slot $T_1$ to receive the downstream signals and is positively biased during time slot $T_2$ to pass the upstream signals transmitted by the local oscillator. The upstream data is sent to the grating section 16 for FSK modulation. This operation scheme is half-duplex in time. Time division multiplexing ("TDM") can be introduced to manage transmitting and receiving time. To achieve full-duplex operation as shown in FIG. 7($b$), a portion of the LO power is used to transmit upstream data. An external modulator 72 is needed for the device to transmit and receive data simultaneously.

The particularly high sensitivity of the transceiver described above (even suffering from the intensity noise) can be partially attributed to the small waveguide loss between the local oscillator and the detector. It also benefits from the novel design of the laser cavity described above. The cavity length and the grating thickness are well controlled so that only one FP mode is inside the Bragg stop band as described above with reference to FIG. 4. This results in a record high side mode suppression ratio (SMSR) (−59.5 dB) semiconductor laser with only 0.8 MHz laser linewidth.

Many factors can affect the sensitivity measurement results. The FP modes distribution will affect the SMSR. The local oscillator threshold will affect the spontaneous noise. The laser linewidth will affect the phase noise. The design of Bragg reflector shape and height and the material gain per unit length will affect all the above results.

One interesting characteristic of the device is that for the gain section, we can send in DC current through an inductor to pump the laser but take out the ac electrical signal through a coupling capacitor. When we do that, the forward biased p-n junction behaves like a Fermi-level detector. There is a logarithmic relationship between carrier number and output voltage V. However, when the signal is small, the logarithmic relationship is actually linear.

By now, skilled practitioners will recognize that other modifications of the instant invention are possible in terms of materials, methods of manufacture, uses depending on the particular application at hand without departing from the spirit of the present invention. Accordingly, the embodiments illustrated and discussed in the specification and drawings should be taken as exemplary in nature and the scope and spirit of the instant invention should be limited only by the following claims.

What is claimed is:

1. An integrated coherent laser transceiver capable of receiving downstream and transmitting upstream laser signals, comprising:

a local oscillator cavity including a gain section, a phase section, and a grating section, said cavity configured so as to have only one below threshold FP mode in the cavity;

a detector section; and means for biasing said detector section.

2. The integrated coherent laser transceiver of claim 1 further including means for canceling the intensity noise of said local oscillator by obtaining a beating signal from said detector section and said gain section.

3. The integrated coherent laser transceiver of claim 1 wherein said one FP mode is inside the Bragg stop band for said cavity.

4. An integrated semiconductor coherent laser transceiver comprising:

a semiconductor waveguide;

a local oscillator cavity formed on said semiconductor waveguide, said local oscillator including a gain section, a phase section, and a grating section; and a detector section formed at on an end of said semiconductor waveguide.

5. The integrated semiconductor coherent laser transceiver of claim 4, wherein said local oscillator cavity is configured so as to have only one below threshold FP mode in the cavity.

6. The integrated semiconductor coherent laser transceiver of claim 5, further including means for biasing said detector section.

7. The integrated semiconductor coherent laser transceiver of claim 6, further including means for canceling the intensity noise of said local oscillator by obtaining a first beating signal from said detector section and a second beating signal from said gain section.

8. The integrated semiconductor coherent laser transceiver of claim 5 wherein said one FP mode is inside the Bragg stop band for said local oscillator cavity.

9. An integrated coherent laser transceiver comprising:

a semiconductor waveguide;

a combined local oscillator cavity and signal mixer, said combined local oscillator cavity and signal mixer including a gain section, a phase section, and a grating section all formed on said waveguide; and a detector formed at an end of said waveguide.

10. The transceiver of claim 9, wherein said combined local oscillator cavity and signal mixer is configured so as to have only one below threshold FP mode in the cavity.

11. The transceiver of claim 9, further including means for biasing said detector.

12. The transceiver of claim 11, further including means for canceling the intensity noise of said combined local oscillator cavity and signal mixer by obtaining a first beating signal from said detector section and a second beating signal from said gain section.

13. The integrated semiconductor coherent laser transceiver of claim 9 wherein said one FP mode is inside the Bragg stop band for said local oscillator cavity.

* * * * *